Feb. 2, 1965     H. ADLER     3,167,996
COMBINATION FILM PROJECTOR AND PRINTING APPARATUS
Filed Nov. 30, 1960     10 Sheets-Sheet 1

INVENTOR.
HAROLD ADLER
BY *Hensway, Jenney & Hildreth*

ATTORNEYS

Feb. 2, 1965  H. ADLER  3,167,996
COMBINATION FILM PROJECTOR AND PRINTING APPARATUS
Filed Nov. 30, 1960  10 Sheets-Sheet 2
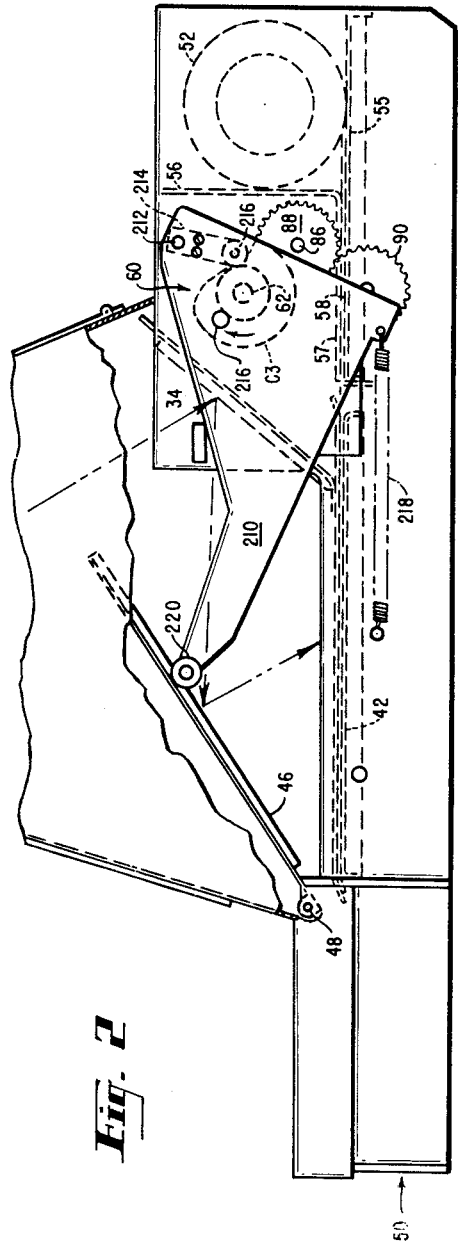
INVENTOR.
HAROLD ADLER
BY *Benway, Jenney & Hildreth*
ATTORNEYS

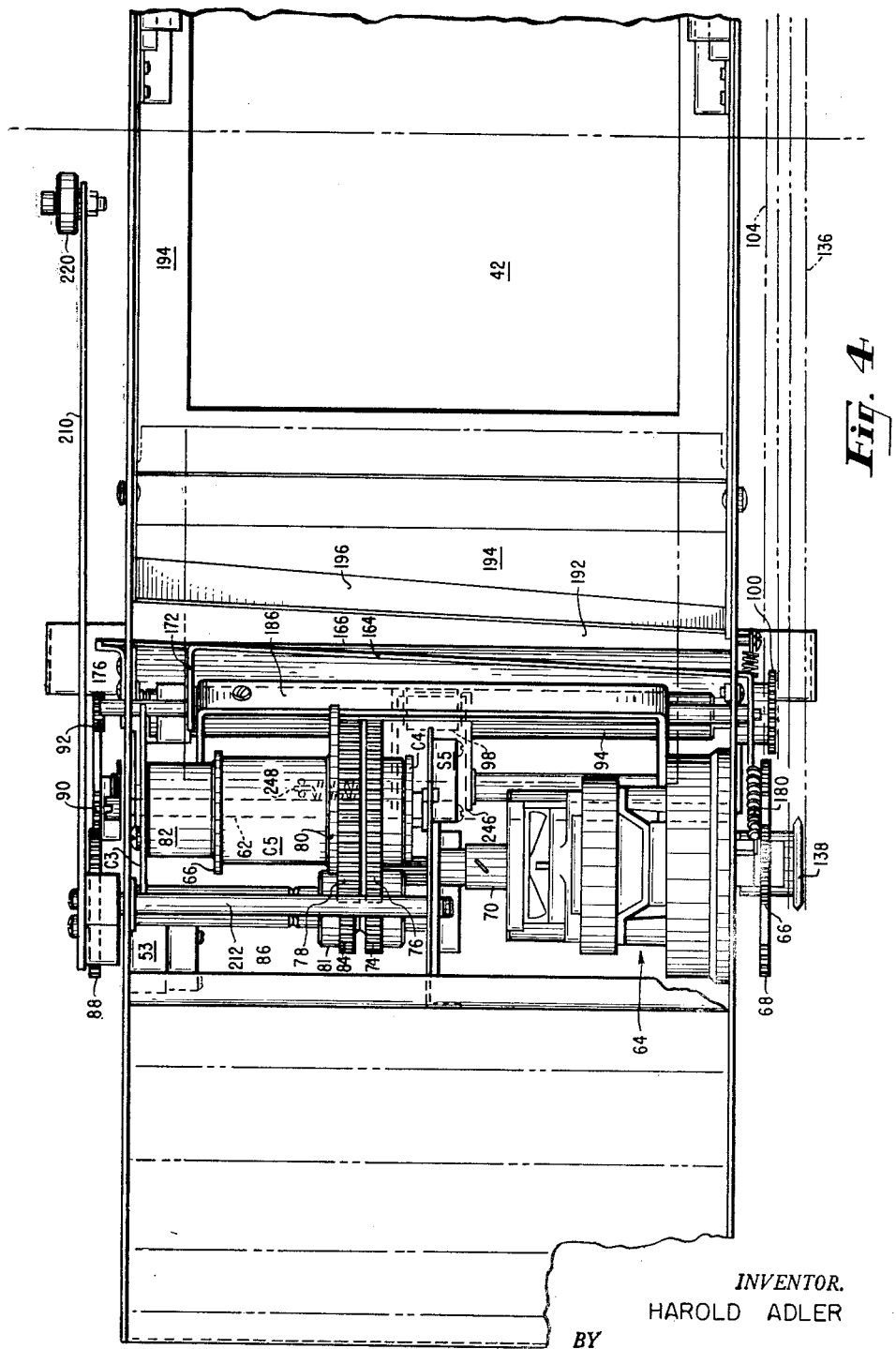

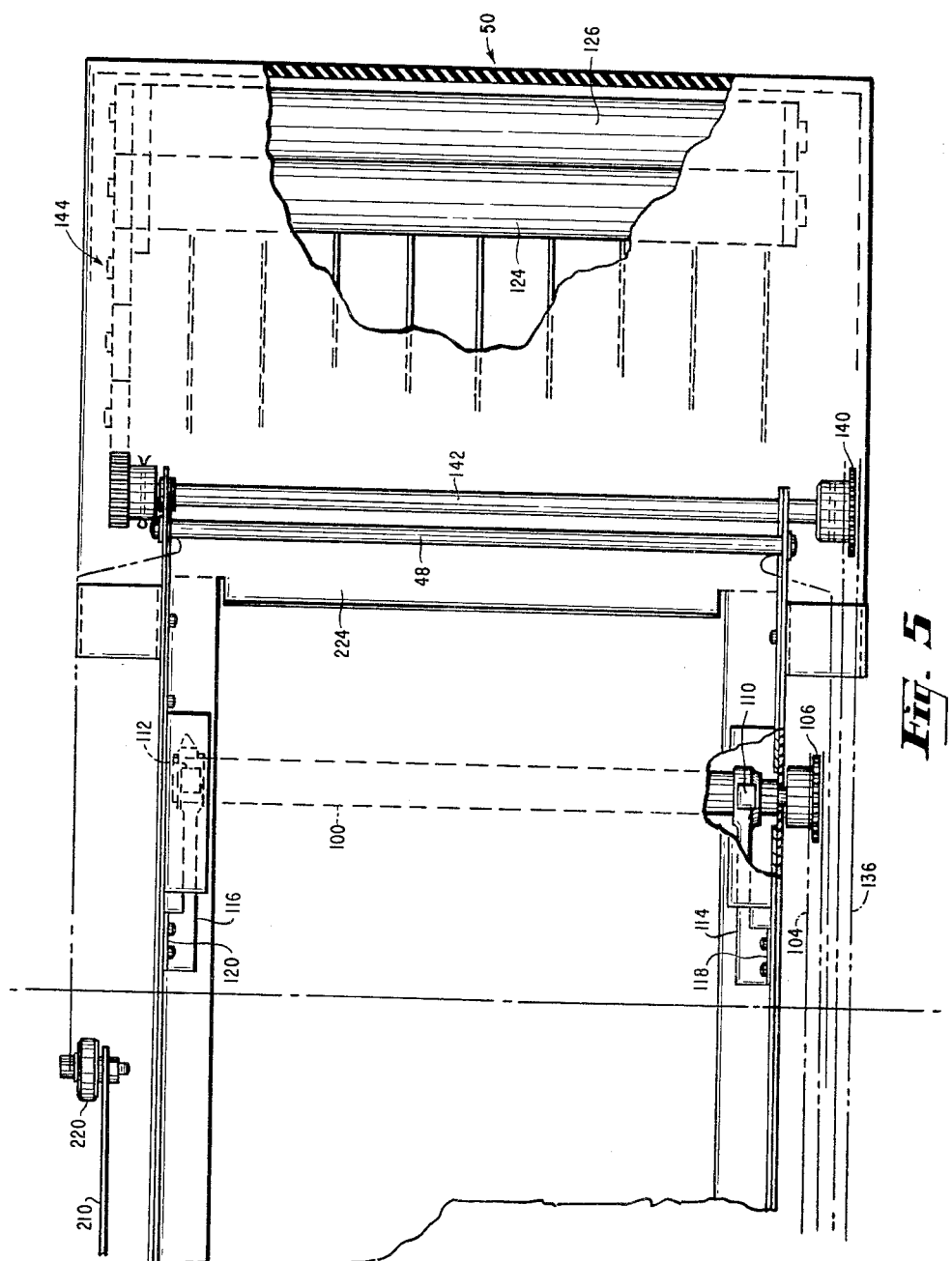

Feb. 2, 1965 H. ADLER 3,167,996
COMBINATION FILM PROJECTOR AND PRINTING APPARATUS
Filed Nov. 30, 1960. 10 Sheets-Sheet 5

INVENTOR
HAROLD ADLER
by
ATTORNEYS

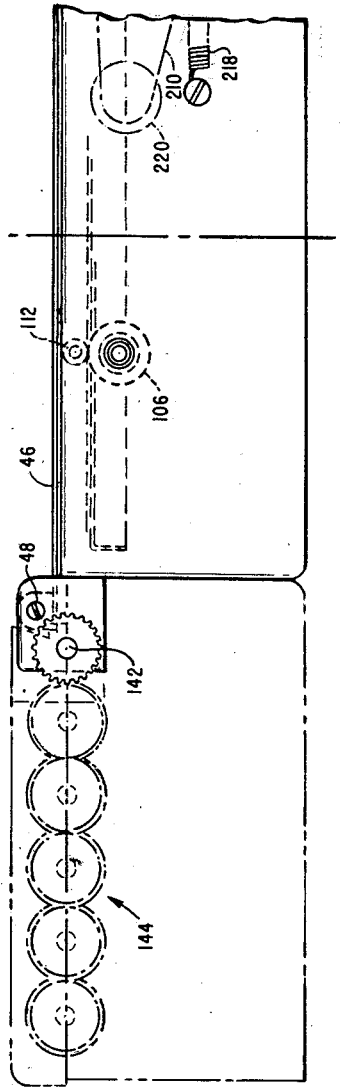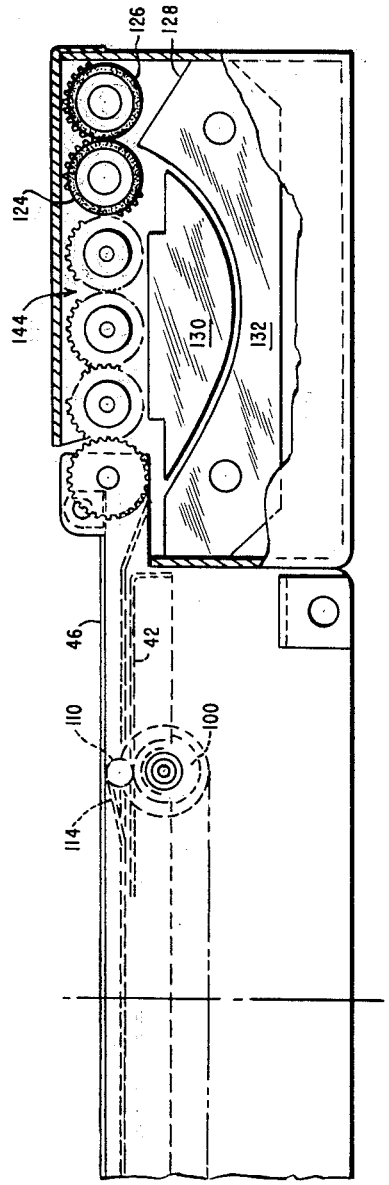

Feb. 2, 1965  H. ADLER  3,167,996
COMBINATION FILM PROJECTOR AND PRINTING APPARATUS
Filed Nov. 30, 1960  10 Sheets-Sheet 7

INVENTOR.
HAROLD ADLER
BY
*Kenway, Jenney & Hildreth*
ATTORNEYS

Feb. 2, 1965  H. ADLER  3,167,996
COMBINATION FILM PROJECTOR AND PRINTING APPARATUS
Filed Nov. 30, 1960  10 Sheets-Sheet 8
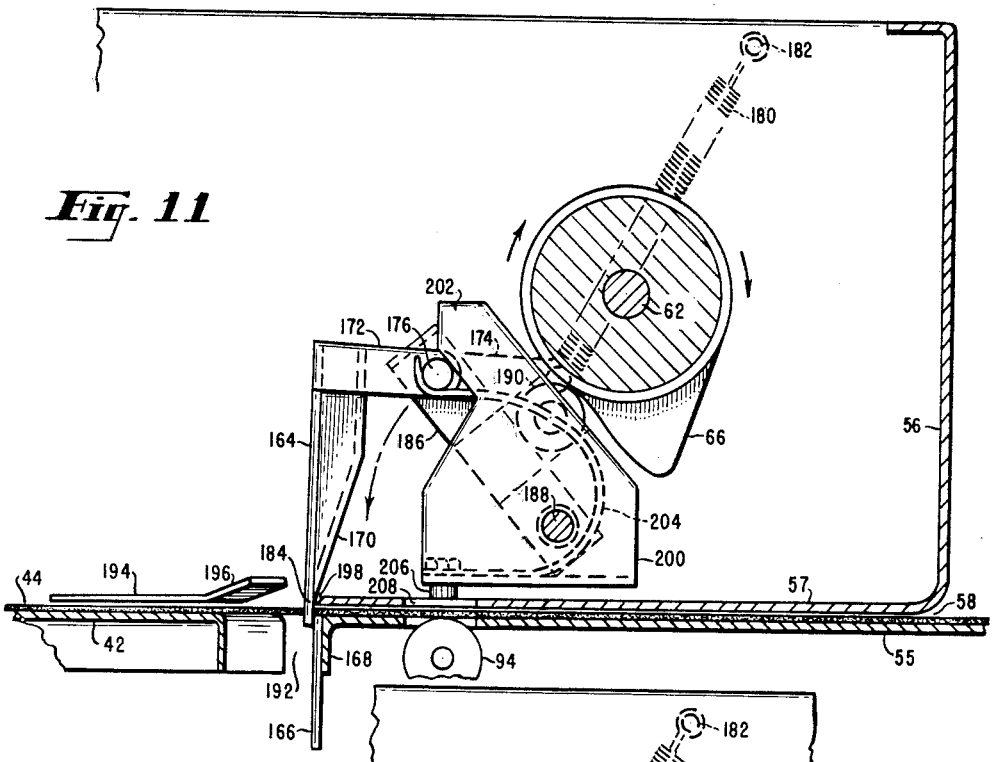
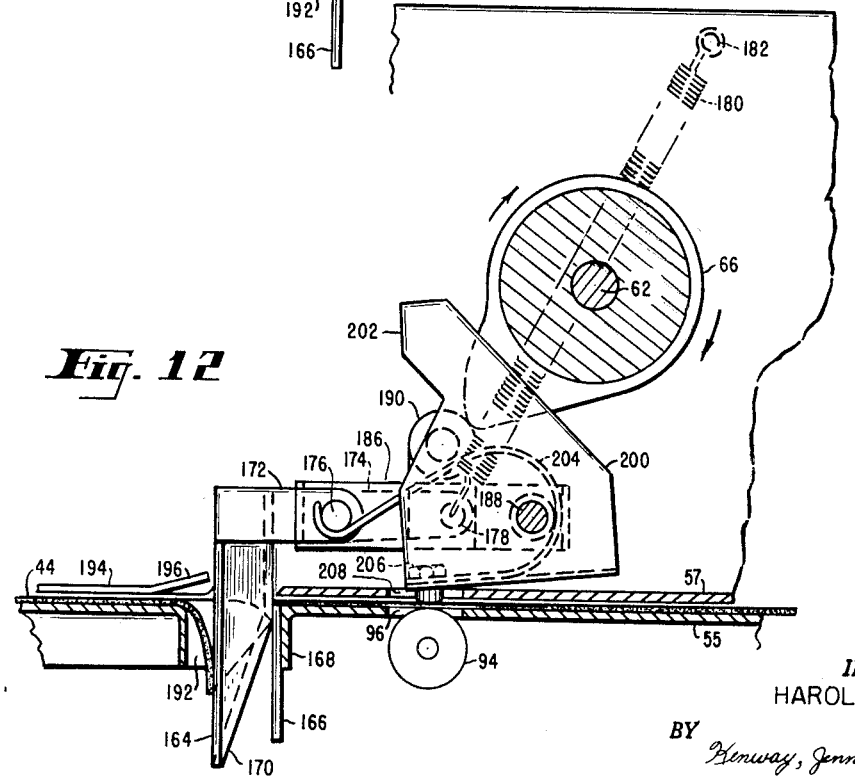
INVENTOR.
HAROLD ADLER
BY
Kenway, Jenney & Hildreth
ATTORNEYS Inventor
HAROLD ADLER
by Henway, Jenney & Hildreth
ATTORNEYS Feb. 2, 1965  H. ADLER  3,167,996
COMBINATION FILM PROJECTOR AND PRINTING APPARATUS
Filed Nov. 30, 1960  10 Sheets-Sheet 10

INVENTOR.
HAROLD ADLER
BY *Kenway, Jenney & Hildreth*

ATTORNEYS

United States Patent Office 3,167,996
Patented Feb. 2, 1965

3,167,996
COMBINATION FILM PROJECTOR AND
PRINTING APPARATUS
Harold Adler, Huckleberry Hill, Lincoln, Mass.
Filed Nov. 30, 1960, Ser. No. 72,729
6 Claims. (Cl. 88—24)

This invention relates to a combination film projector and printing apparatus and more particularly to a new and improved device for viewing microfilms and concurrently making enlarged copies thereof.

In recent years, the use of microfilmed records has become increasingly popular. Primarily this trend has been the result of a desire to reduce the storage requirements for duplicates of the original records. The practice has resulted in more efficient storing, indexing and handling of records and also has reduced the time and effort needed to search through records.

Generally, microfilm records are stored on reels with perhaps several hundred pages recorded on a single reel. The contents of the reel may be examined by means of a viewer which projects single frames onto a screen on an enlarged scale suitable for viewing purposes.

Frequently it is desirable to make enlarged copies of a particular frame so that the data contained therein may be readily available for future reference. In order to expedite the examination of other microfilm records it would be advantageous if the selected frame could be copied quickly and easily and without interrupting to any great extent the viewing of subsequent frames.

Accordingly, it is an object of the present invention to provide an improved combination film projector and printing apparatus.

It is another object of the invention to provide a combination microfilm viewing and printing apparatus in which prints of any selected film may be made quickly and easily with a minimum of interruption in the operation of the apparatus.

Yet another object of this invention is to provide an improved intermittent driving arrangement for dispensing photographic printing paper from a supply roll to an easel where it is exposed.

More particularly, the invention features a programming arrangement in which a motor-driven assembly of gears and cams serves to operate switches, cam followers and gears in timed relation to one another for the purpose of actuating various elements of the machine in timed and coordinated sequence. As a particular feature of the invention, the programming mechanism utilizes an intermittent gearing arrangement in which a driving gear rotates at a constant speed while the rotation of a driven gear is interrupted at pre-selected intervals during which the driven gear is locked in position without jamming.

As another feature of the invention, a shearing mechanism, comprising a fixed blade and a movable blade is disposed transversely to the length of the paper and arranged so that the cutting edges of the two blades will bear against one another with a constant pressure and maintain a proper cutting relation during the entire shearing operation.

These and other features of the invention along with further objects and advantages thereof will become more readily apparent from the following detailed description of a preferred embodiment of the invention, taken in connection with the accompanying drawings, in which;

FIG. 2 is a view similar to FIG. 1, but with parts broken away to show a mirror-moving mechanism;

FIG. 3 is a view similar to FIG. 2, but with parts broken away to show a shearing mechanism and a paper-developing portion of the apparatus;

FIG. 4 is a top plan view of a programming portion of the machine with upper housing portions removed;

FIG. 5 is a top plan view of the paper-developing portion of the apparatus;

FIG. 7 is a detailed view in side elevation showing another portion of the side of the apparatus opposite to the side shown in FIG. 1, on an enlarged scale;

FIG. 9 is a view corresponding to FIG. 7, but showing the opposite side of the machine;

FIG. 11 is a sectional view in side elevation showing the shearing mechanism with the movable blade in its uppermost position;

FIG. 12 is a view similar to FIG. 11, but showing the movable blade in its lowermost position;

In its preferred embodiment, the apparatus of the invention utilizes a film-projecting head for projecting an image against a reflecting surface, which is focused on a viewing screen so that an operator may observe the projected film image on an enlarged scale. The apparatus also includes a mirror that is movable into the line of sight between the reflecting surface and the viewing screen so as to interrupt the light path and to reflect the image downwardly against a sheet photographic paper, thereby exposing the paper to the projected image. When the exposure has been made, the mirror returns to its original position and the exposed sheet is carried through a developing section and passed out of the machine. A roll of light-sensitive photographic paper is stored in the apparatus and is fed automatically onto an easel on which the exposure is made.

The feeding and exposure of the paper, as well as the operation of the mirror, are controlled by means of a motor-driven programming mechanism which first turns off a projecting lamp and raises the mirror from a lowered position to a position for reflecting an image onto a sheet of photographic paper. The projecting lamp is then energized for a predetermined period to afford a pre-selected light intensity for exposing the photographic paper, whereupon the mirror is returned to its lowered position. The programming mechanism then causes the exposed paper to advance into a processing tank where the image is developed, and passes the finished print out of the apparatus.

As the print is being developed, the programming mechanism causes a predetermined length of photographic paper to be drawn and cut from the supply roll and then centered on the easel for a subsequent printing operaiton.

Figure 1:
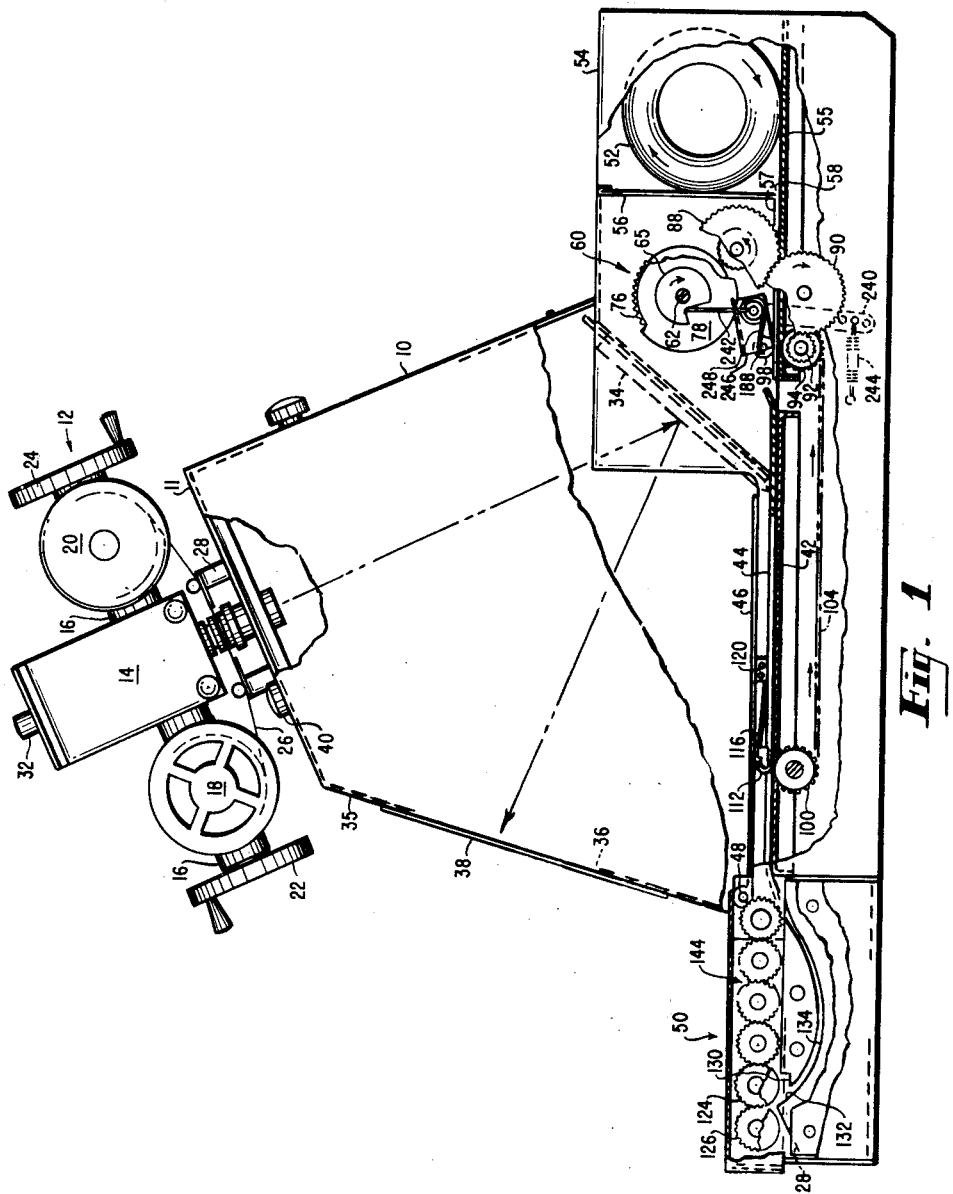
FIG. 1 is a view in side elevation and partly in section of a combination film projector and printing apparatus made according to the invention.

Referring now to the drawings, there is illustrated in FIG. 1 a combination film projector and printing apparatus made according to the invention, with the various components organized about a housing or cabinet 10. A projecting head generally designated 12 is mounted on an angled top 11 of the housing, and is adapted to project a photographic image into the interior thereof. Any suitable projecting head may be utilized for this purpose, although in this instance there is shown a projecting head having a lamp housing 14 and outwardly extending arbors 16 for supporting microfilm reels 18 and 20. Hand cranks 22 and 24 are provided to advance a microfilm strip 26 from one reel to the other.

A stage 28 is provided beneath the lamp housing 14 to support the microfilm strip 26 for passage between the lamp housing and a lens 30. It will be apparent that single slides or short strips of film may be placed on the stage if desired. A variable-intensity lamp system (not shown) is utilized, which is preferably of the condenser type. A knob 32 is provided on top of the lamp housing 14 for adjusting the intensity of the lamp. The projecting head 12 is preferably mounted for rotation about the axis of the lens 30, so that the projected image may be properly oriented for viewing or copying.

The upper portion of the cabinet 10 has a generally prismatic configuration, and houses a mirror 34 mounted opposite the lens 30. A wall 35 of the housing is apertured at 36 for the projection of an image upon a viewing screen 38 overlying the aperture. The wall 35 is so oriented that an image projected from the head 12 will be reflected from the mirror 34 against the viewing screen for observation by the operator. It will be understood that the projected image appearing on the screen 38 is greatly enlarged by the lens 30, and is preferably of a size corresponding to that of the original document.

When it is desired to make a print of a particular frame, the image is centered on the screen 38 by manipulating the cranks 22 and 24 as well as the projecting head 12. When the image is properly centered, a print button 40, located on top of the cabinet, is pressed to start the machine through a printing cycle.

Mounted horizontally in the cabinet 10 and adjacent to the lower edge of the mirror 34 is a generally flat easel 42, which is adapted to support a sheet of photographic paper 44 in a substantially flat condition. A movable mirror 46 is pivoted in the housing at 48 and normally overlies the easel 42 and the sheet of paper 44. When a print is to be made of the image displayed on the viewing screen 38, the movable mirror 46 is raised to the position shown in FIG. 2 so as to interrupt the light reflected from the fixed mirror 34, and to direct the image onto the photographic paper 44. Once the paper has been exposed, the mirror is returned to its normal lowered position and the paper is advanced into a developing apparatus generally designated 50, which is located in the front of the base portion of the cabinet.

In the rear of the cabinet, a roll of photographic paper 52 is contained in a light-tight compartment 54 provided with a suitable access door (not shown). A horizontal plate 55, parallel with the easel 42, supports the roll 52 and an upright wall, which forms a division between the light-tight compartment 54 and the interior of the cabinet. The wall 56 is formed with a flange 57 which extends forwardly in parallel spaced relation with the plate 55 to define a horizontal passageway 58 for the paper 44.

*Programming and paper drive mechanisms*

Figure 13:
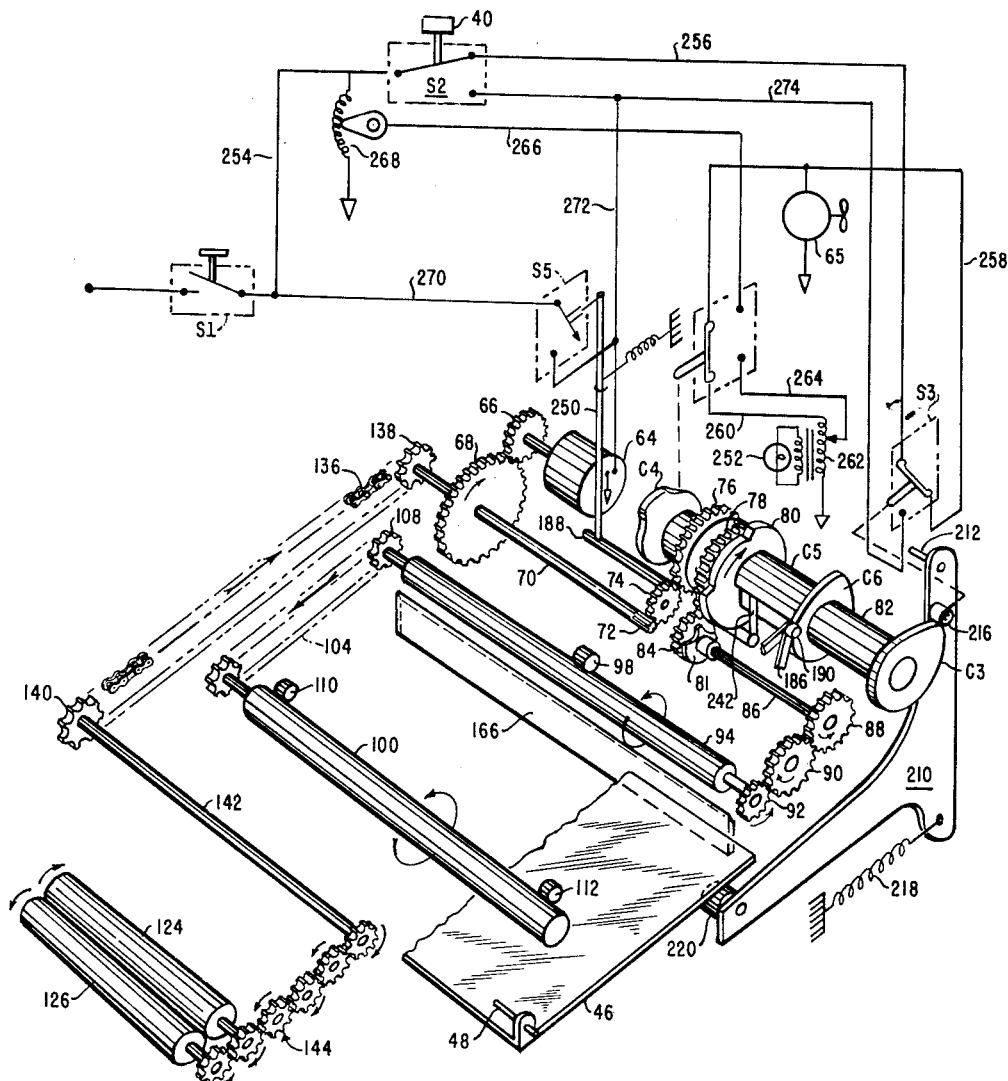
FIG. 13 is a schematic pictorial view showing a programming mechanism of the apparatus.

The paper is unwound from the roll 52 and fed onto the easel by means of a paper dispensing mechanism which is governed by a programming mechanism generally indicated at 60, and best shown in FIG. 13. The programming mechanism is mounted within the cabinet forwardly of the wall 56 and rearwardly of the fixed mirror 34. Essentially the programming mechanism is an assembly of gears and cams mounted upon a shaft 62 which, in this embodiment, rotates one full revolution for each cycle of the apparatus. A motor 64 (FIGS. 4, 6 and 13), cooled by a fan 65 and mounted on a side of the cabinet, drives the programming mechanism through a gearing arrangement which includes a drive gear 66 which meshes with a pinion 68 keyed to a countershaft 70. The shaft 70 is formed with a spline 72 which meshes with an idler 74. The idler 74 in turn meshes with a main gear 76 keyed to the shaft 62.

The shaft 62, in addition to the main gear 76, also supports a timing cam C4, an intermittent drive gear 78, a locking cam 80, a motor control cam C5, a shear cam C6, a spacer 82 and a mirror cam C3.

The intermittent drive gear 78 engages a pinion gear 84 which is keyed to an intermittent drive shaft 86. A locking cam 81 is keyed on the shaft 86, and frictionally engages the periphery of the cam 80. At the outer end of the intermittent drive shaft there is mounted a gear 88 meshing with an idler gear 90. The gear 90 in turn meshes with a gear 92 mounted on the end of a paper dispensing roller 94. The roller 94 is mounted below the plate 55 but extends partially through an opening 96 formed transversely in the plate. The mounting of the roller 94 is such that its top surface is generally tangent to the top surface of the plate 55 and the bottom surface of the paper 44 being fed from the roll 52. A pressure wheel 98, located directly over the roller 94, is adapted to press down upon the paper and the roller so that the paper is fed forwardly when the roller is rotated.

Disposed parallel to the dispensing roller 94 and below the forward portion of the easel 42 is a roller 100 which serves to advance the cut and exposed paper into the developing section 50. The roller 100 is driven by means of an endless chain 104 looped over a sprocket 106, on the end of the roller 100, and a sprocket 108 mounted on the end of the dispensing roller 94. A pair of small pressure wheels 110, 112 ride on the top extremities of the roller 100 to grip the marginal edges of the paper. The wheels 110 and 112 are supported by spring members 114 and 116, which are secured to the cabinet at 118 and 120, respectively. As may be seen in FIG. 3, the upper portion of the roll 100 extends partially through a transverse slot 122 positioned forwardly in the easel 42, so that the upper surface of the roller 100 is generally tangent to the upper surface of the easel.

On the foremost part of the developing section 50 a pair of squeeze rollers 124 and 126 are mounted in parallel relation for resilient engagement with one another. These rollers are located over a removable inner tray 128 which normally contains a quantity of developing fluid. The tray is formed with a plurality of guide assemblies, each of which includes an upper plate 130 and a lower plate 132 spaced slightly from one another and have cooperatively curved surfaces defining a passage 134 by which the exposed paper is guided in and out of the developer. From the tray the paper is fed into the bite of the rollers 124 and 126, which remove excess fluid and pass the finished print out to the operator. The squeeze rollers are driven continuously by means of an endless chain 136 looped over a sprocket 138 on the countershaft 70 and a sprocket 140 secured to a shaft 142. The drive is transmitted from the shaft 142 through a gear train 144 to the squeeze rollers 124 and 126.

Although the squeeze rollers are continuously driven during the cycling of the programming mechanism 60, the paper dispensing roller 94 and the roller 100 are driven intermittently. This intermittent movement serves to draw a length of paper from the supply roll, stop the paper while it is being cut, advance it onto the easel, stop it once again for exposure, and finally deliver it into the developing tank. This sequence of operation is carried out by means of the intermittent drive assembly which includes the gears 78 and 84 and their associated locking circles 80 and 81.

Figure 14:
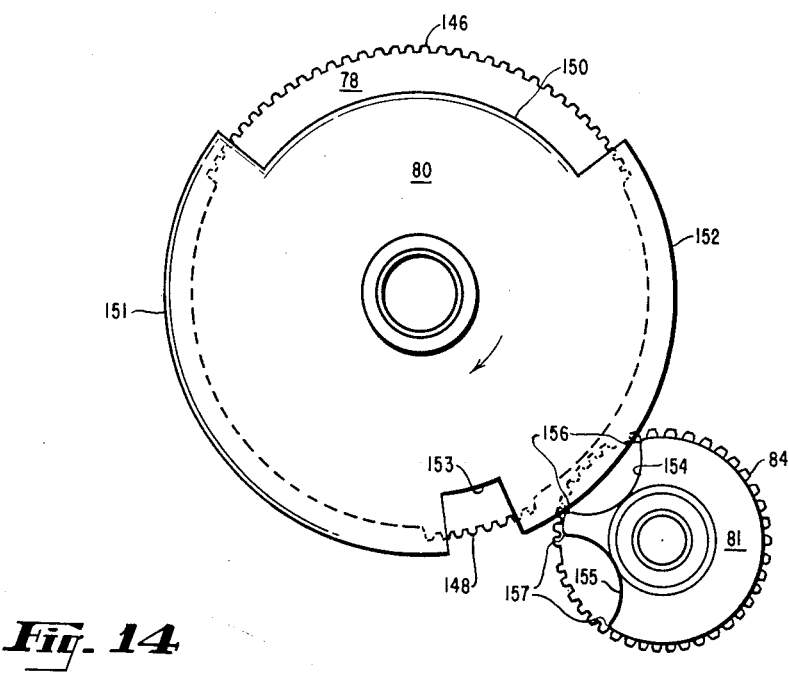
FIG. 14 is a sectional view in side elevation of a portion of the programming mechanism.

As best shown in FIG. 14, it will be noted that the drive gear 78 has an incomplete set of teeth. A relatively long arcuate sector 146 and a shorter arcuate sector 148 are provided with teeth, while arcute sectors 150 and 152 between these quadrants have no teeth. It will be understood that while the gear 78 is rotating at a constant speed, the driven gear 84 will turn only when the toothed sectors 146 and 148 of the driving gear 78 mesh with the teeth of the driven gear 84. The locking circles 80 and 81 are provided to brake the driven gear 84 against rotation during the periods of dwell when the toothed sectors 146 and 148 move out of mesh with the gear 84. The locking circle 80 has an outside diameter somewhat greater than that of the gear 78 and is firmly secured to that gear. The profile of the locking circle 80 is characterized by a notch 150 which may have an arc length of about 110° and is formed between two lobe portions 151 and 152. The notch 150 is aligned with the toothed sector 146 of the gear 78. A smaller notch 153, which may have an arc length of about 10° is formed generally opposite the larger notch 150 and is aligned with the toothed sector 148. The locking circle 81 has an outside diameter slightly smaller than the outside diameter of the gear 84 to which it is secured. The circle is scalloped at 154 and 155, forming pairs of shoulders 156 and 157, one of which abuts and slides over a corresponding one of the lobes 151 and 152 during each period of dwell. The scallops 154 and 155 provide clearance for the circumferential edges of each of the lobes 151 and 152 as they move into and depart from operative engagement with the mating pair of shoulders 156 and 157. During the period of dwell shown, the pair of shoulders 156 rides along the lobe 152, effectively locking the gear 84. The locking circle 81 is rotated to this position by meshing of the toothed sector 148 with the gear 84. During the other period of dwell, the lobe 151 passes over the pair of shoulders 157. The locking circle 81 is rotated to the latter position by the meshing of the toothed sector 146 with the gear 84.

In order to prevent jamming of the gears when a toothed sector is coming into mesh with the gear 84, a tooth is removed from the gear 84 at each point of contact where the teeth first mesh. As will be seen in FIG. 14, the teeth are removed at points 160 and 162 so that the leading tooth of the toothed sector 146 or 148 will have a clear approach to the tooth adjacent the gap created by the removed tooth. Since there is a slight amount of play between the gears and their locking circles, there would exist a possibility that the gears might jam when meshing unless the teeth have been removed in this manner.

Shearing mechanism

Referring now particularly to FIGS. 4, 10, 11 and 12, there is illustrated a novel shearing mechanism for cutting the sheet of paper 44 from the roll 52. The shearing mechanism includes a movable blade 164 and a fixed blade 166. The fixed blade 166 is disposed transversely to the path of travel of the paper and is mounted on a downwardly turned flange 168 at the forward portion of the plate 55. The movable blade 164 is formed with a diagonal cutting edge 170 (FIG. 10) and the blade itself is oriented at a horizontal angle with respect to the lower fixed blade 166 (FIG. 4). A pair of arms 172, 174 are formed in the ends of the blade 164 and extend rearwardly to pivotally engage a rock-shaft 176. The arm 174 is somewhat longer than the arm 172 and engages one end of a tensioned coil spring 180 whose opposite end is securely fastened to the cabinet at 182. The spring 180 urges the shearing mechanism toward the raised position of FIG. 11 and also applies a moment to the blade arm 174 such as the blade 164 is biased into pressure contact with the fixed blade 166. To keep the movable blade 164 in engagement with the fixed blade 166, the movable blade is formed with an extended portion 184 which bears against the fixed blade even when the movable blade is in the raised position of FIGS. 10 and 11.

The shaft 176 passes longitudinally through an open shear frame 186. The shear frame is pivotally mounted upon an axle 188 supported in the cabinet parallel to the shaft 176, and is provided with a cam follower 190 which rides against the cam C6.

Figure 10:
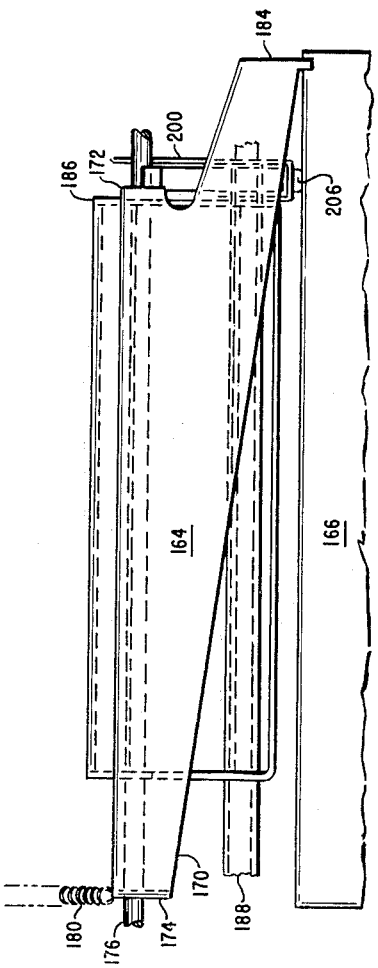
FIG. 10 is a view in front elevation of a shearing mechanism.

From the above description and reference to FIGS. 11 and 12 it will be clear that the blade 164 remains in its raised position (FIG. 11) until the lobe of the cam C6 comes into contact with the follower 190. When this takes place, the shear frame 186 pivots counterclockwise about the axle 188. This motion moves the blade 164 forwardly and downwardly toward the position of FIG. 12 in a cutting stroke. The movable blade maintains the same cutting relationship to the fixed blade during the entire cutting stroke. The blade 164 remains in a substantially vertical position from the beginning to the end of the stroke. Since the movable blade is formed with a diagonal cutting edge 170 and is disposed at a horizontal angle to the fixed blade, a point of cutting engagement between the two blades moves from right to left, as seen in FIG. 10, to cut the paper 44 cleanly and evenly.

As it moves downwardly, the blade 164 passes through a diagonal slot 192 formed between the forward end of the plate 55 and the rearward end of the easel 42. An easel frame 194 is mounted slightly above the easel 42, and is formed with an upwardly turned lip 196 adapted to funnel the leading edge of the paper 44 into the space between the easel and the easel frame.

On the opposite side of the slot 192, the forward edge of the plate 57 is beveled at 198 to strip the paper from the rear of the blade 164 as it returns to its raised position. Associated with the shearing mechanism is a paper locking device adapted to hold the paper against movement while it is being cut. This device includes an end plate 200 pivotally mounted on the axle 188 and formed with a nose piece 202 which bears against the shaft 176 when the blade 164 is in a raised position (FIG. 11). A U-shaped spring 204 is mounted under tension with one end engaging the shaft 176 and the opposite end engaging the end plate 200, tending to bias the plate downwardly. A paper stop button 206 is secured to the lower portion of the plate and is located over the dispensing roller 94. When the blade 164 is moved downwardly (FIG. 12) the shaft 176 is carried out of contact with the nose piece 202 and compresses the spring 204, thereby causing the end plate 200 to rotate counterclockwise about the axle 188 to bring the button 206 down through an opening 208 and into engagement with the paper and the dispensing roller 94. The button 206, along with the pressure wheel 98, effectively brakes the roller 94 and prevents the paper from pulling or pivoting as it is being cut. On the return stroke of the blade, the shaft 176 strikes the nose piece 202, thereby pivoting the end plate 200 and the button 206 back to the raised position of FIG. 11.

Mirror lift mechanism

The mirror 46 has been described as being pivotally mounted about the pivot 48 and as being adapted to move from its viewing position (FIG. 1), in which it overlies the paper and the easel, to a raised position for printing (FIG. 2).

Figure 8:
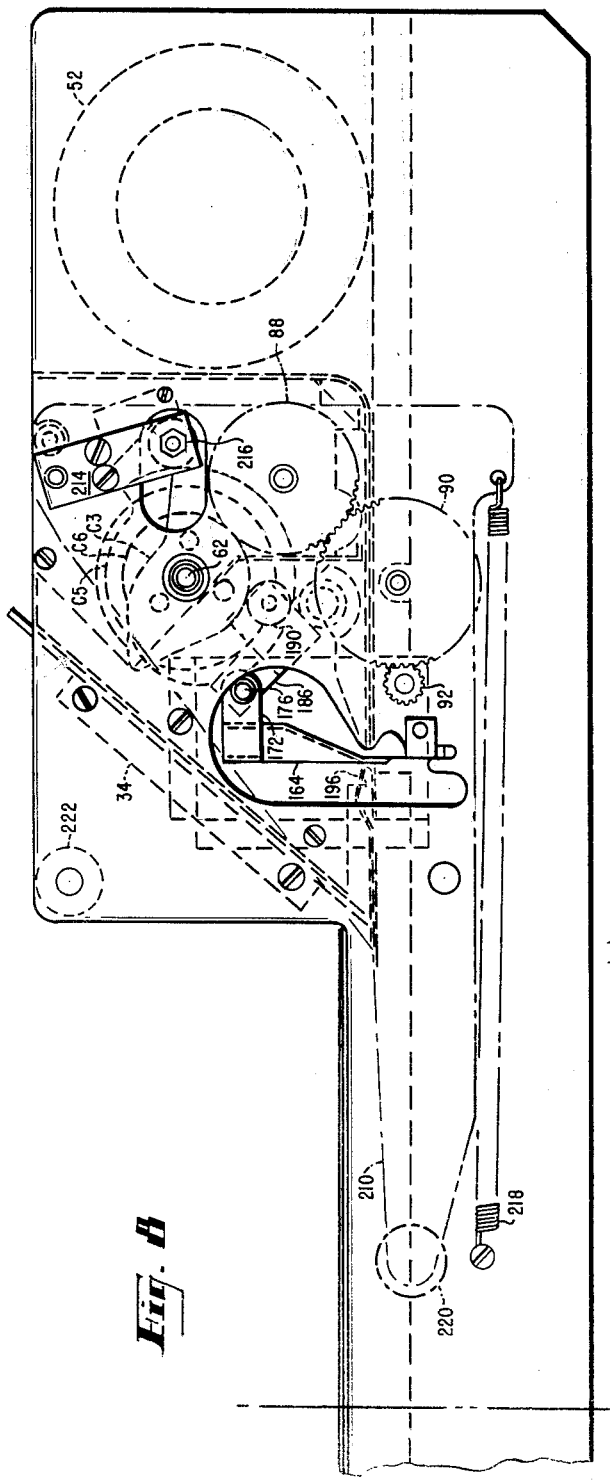
FIG. 8 is a view corresponding to FIG. 6, but showing the opposite side of the machine.

The position of the mirror is determined by means of the cam C3 in cooperation with a mirror lift arm 210. The arm is pivotally mounted in the cabinet by means of a pin 212 and is drivingly connected with a cam follower 216 by a linkage 214. A coil spring 218 is secured under tension to the lower portion of the arm 210 and to the cabinet, urging the arm into the raised position of FIG. 2. A roller 220 is mounted upon an extremity of the arm, and rides against the marginal edge of the mirror frame. As the shaft 62 rotates, the lobe of the cam C3 initially forces the arm 210 to remain in its lowered position (FIG. 8). However, when the follower 216 reaches the notched section of the cam C3, the arm is urged forwardly and upwardly under the tension of the spring 218, until it strikes a mirror stop 222 mounted on the side of the cabinet. The mirror is then in the raised position of FIG. 2. To avoid the possible transmission of vibration from the programming mechanism to the mirror, the notch of the cam C3 is formed with sufficient depth that the follower does not bear against it while the paper is being exposed.

Once the exposure has been made, the lobe of the cam C3 acts against the follower 216 to lower the arm 210. The mirror 46, moving under its own weight, follows the arm down until it again overlies the easel.

The lowering of the mirror is timed so that the mirror edge adjacent the pivot 48 will meet with the leading edge of the following unexposed sheet of paper to tuck it under an upwardly flared lip 224 (FIG. 3) formed in the easel frame 194. Since the photosensitive paper has a natural tendency to curl upwardly, there would exist a possibility that the paper would jam at the entrance of the passage 134 unless it were fed into it in a flattened condition.

Paper threader

Figure 6:
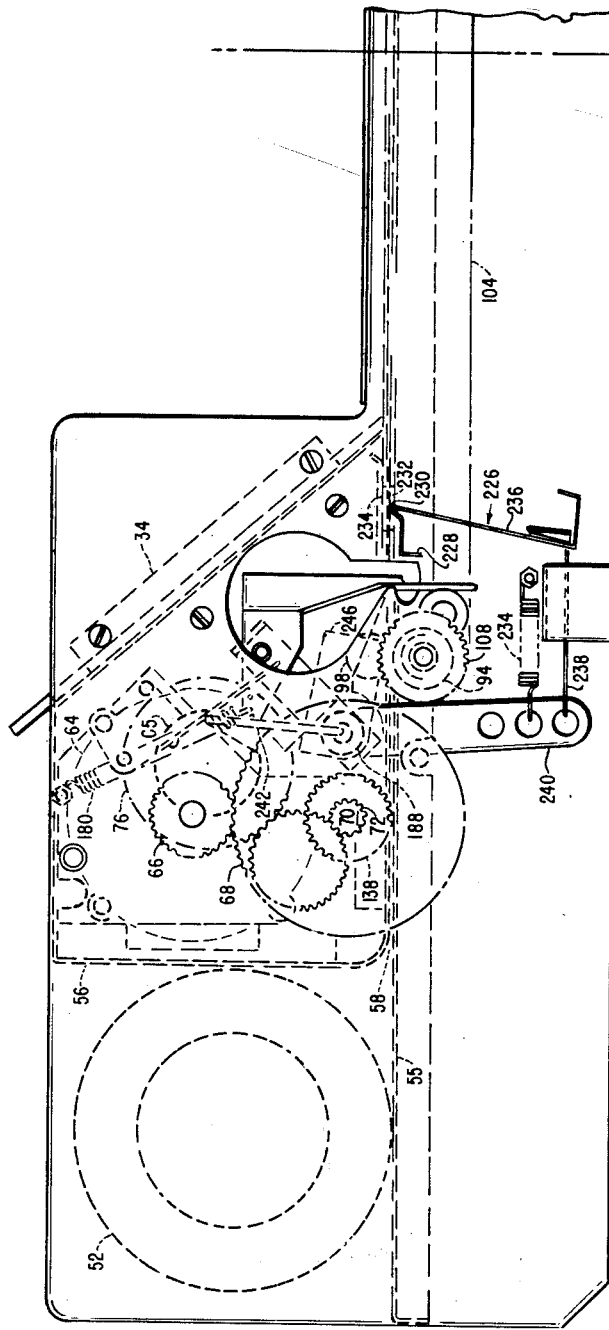
FIG. 6 is a detailed view in side elevation showing a portion of the side of the apparatus opposite to the side shown in FIG. 1, on an enlarged scale.

Referring now to FIG. 6, there is illustrated a threading device which serves to assist in the loading and threading of fresh rolls of paper.

This device includes a spring steel paper stop 226 fixedly secured at an end 228 to the underside of the easel 42. The stop is formed with an upwardly extending finger 230 which is adapted to project through aligned openings 232 and 234 formed in the easel and the easel frame, respectively. A downwardly extending leg 236 engages with a link 238 which in turn is connected to the lower end of a lever 240. The upper end of the lever 240 is keyed to the end of the axle 188 so that rotation of the axle will pivot the lever to pull the finger down through the openings 232, 234 and out of the path of the paper.

When the paper supply is being replenished, the leading edge is fed through the passage 58 and advanced forwardly until it abuts the finger 230. This positions the paper precisely with respect to the dispensing mechanism and nothing further need be done. The machine is then cycled once to advance the first sheet of paper onto the easel. When the machine is started, the axle 188 turns sufficiently to pull the finger 230 down out of the path of the paper, permitting the paper to be advanced. Thereafter the finger is held down by the paper passing over the opening 232, and the finger does not rise again until the entire roll has been exhausted and the trailing edge has passed over the opening.

The lever 240 and the axle 188 are pivoted by means of a pin follower 242 extending radially from the axle into engagement with the cam C5. It will be readily seen in FIG. 13 that when the programming mechanism first starts to cycle the pin follower 242 is moved out of the notch in the cam C5. This movement pivots the axle 188 and the lever 240 to actuate the threading mechanism against the bias of a coil spring 234 (FIG. 6).

As best seen in FIG. 1, the rear pressure wheel 98 is mounted within a holder 246 which in turn is mounted on the axle 188. A spring 248 is coiled about the axle with one end locked about the pin follower 242 and the other end engaging the outer end of the holder to bias the wheel down against the paper and the roller 94.

It will be observed in FIG. 13 that the axle 188 also supports a radially extending pin 250 which is adapted to actuate a switch S5. The function of the switch S5 will be described in detail in connection with a description of an electrical circuit of the apparatus.

Electrical circuit

Referring now to FIG. 13, there is illustrated in diagrammatic form a circuit suitable for energizing the various components of the projector and printing apparatus.

The circuit includes a normally open main switch S1 connected to a 110 volt A.C. power source. Closing of the switch S1 turns on a projecting lamp 252 by completing a circuit from the power source through a lead 254 to a double-throw switch S2. The switch S2 is normally biased against the contact for a lead 256 which connects with another two-way switch S3 located adjacent the cam C3. The switch S3 is normally connected with the contact of a lead 258 which is connected to the fan 65 and to a double-pole timing switch S4, mounted in operative relation to the cam C4. One pole of the switch S4 is connected to a lead 260 for energizing a transformer 252. A second lead 264 connects the transformer to the opposite pole of the switch S4. The latter pole is connected by a lead 266 to a rheostat 268 which, in turn, is connected to the lead 254.

The motor 64 is controlled by a normally open switch S5 with one contact connected through a lead 270 to the lead 254 and the other contact being connected to a lead 272. The lead 272 in turn connects with a lead 274 running between the normally open contacts of the switches S2 and S3. It will be noted in FIG. 13 that the switch S5 is biased in a normally open position by means of the pin 250 which is controlled by the cam C5.

Operation

The operation of the machine is as follows: After a roll of microfilm has been properly mounted on the projecting head 12, the main switch S1 is manually closed. This energizes the lamp 252 to project an image onto the viewing screen 38.

The lamp circuit may be traced from the power source, through the switch S1, the lead 254, the switch S2, the lead 256, the switch S3, the lead 258, the switch S4, the lead 260, and through the transformer 262 to the lamp 252.

When a particular frame has been selected for copying, the print button 40 is pressed for about one second to throw the switch S2. This opens the circuit to the lamp and closes the circuit to the motor to start the programming mechanism 60 through its cycle. The motor circuit may be traced from the power source through the now closed switch S1, the lead 254, the switch S2, and the leads 274 and 272 to the motor. Shortly after the motor has started the cycle of the programming mechanism, the cam follower 216 passes into the notch of the mirror cam C3, raising the mirror 46 and throwing the switch S3. The switch S3 then takes over electrical control of the motor and the switch S2 may be released. The motor circuit may now be traced from the power source through the switch S2, the lead 256, the switch S3, and the leads 274 and 272 to the motor.

When the mirror is in its raised position, the lobe of the timing cam C4 throws the switch S4 to energize the lamp and expose the sheet of photosensitive paper on the easel to the projected image. The lamp circuit may be followed from the power source through the switch S1, the lead 254, the variable rheostat 268, the lead 266, the switch S4 and the lead 264, to the transformer 262 for the lamp 252.

When the lobe of the cam C4 has passed out of contact with the switch S4, that switch will return to its original position, thereby opening the lamp circuit. Shortly thereafter, the lobe of the mirror cam C3 bears against its follower 216 to pivot the arm 210 and lower the mirror 46. The switch S3 is at the same time returned to its normal position. However, the cam C5 will have rotated sufficiently to pivot the follower pin 242 and thereby cause the pin 250 to close the switch S5, thus completing a ciruit to the motor. This circuit is traced from the power source through the switch S1, the lead 270, and the switch S5 to the motor.

During the first part of the cycle, while the mirror is raised and the exposure is being made, the paper is not moved, since the toothless sector 150 of the intermittent drive gear 78 is moving over the locked gear 84. However, once the exposure is completed, the toothed sector 146 meshes with the gear 84 to turn the rollers 94 and 100 to advance the exposed sheet into the developing section 50 and to feed a new sheet onto the easel. The squeeze rollers 124 and 126 run continuously during the entire cycle. The rollers 94 and 100 continue to turn until the squeeze rollers pick up the leading edge of the exposed sheet and the roller 100 picks up the leading edge of the fresh, uncut sheet.

At this point the toothed sector 146 of the gear 78 moves out of mesh with the gear 84, which now becomes locked as the toothless sector 152 passes over the gear 84, thereby stopping the rollers 94 and 100.

Once the paper is stopped, the lobe of the cam C6 comes into contact with the shearing mechanism, simultaneously locking and cutting the paper. After the shearing operation, the toothed sector 148 of the gear 78 meshes with the gear 84 to advance the cut sheet a short distance forward where it will be centered on the easel.

Finally, the notch of the cam C5 moves into alignment with the pin follower 242 so that the pin drops into the notch. This pivots the axle 188 and the pin 250, thereby opening the switch S5 to stop the motor.

It will be understood that modifications and variations of the present invention may be effected without departing from the spirit and scope of the novel concepts thereof.

What I claim and desire to obtain by Letters Patent of the United States is:

1. In a photographic printer, means for intermittently advancing, exposing, and developing sensitized paper cyclically, comprising in combination: an easel, paper-feeding means for passing an indefinite length of sensitized paper over said easel; a planar element pivotally mounted with respect to said easel, for movement to a lowered position overlying said easel to overlie and guide paper thereover in a flat condition, and for movement to a raised position for exposing of paper positioned on said easel; programming mechanism comprising at least one cam means and intermittent drive gearing, drivingly connected for joint rotation, and motive means for rotationally driving said cam means and drive gearing; means drivingly connecting said planar element with said cam means; means drivingly connecting said paper-feeding means with said intermittent drive gearing; said cam means and said intermittent drive gearing being constructed and arranged to successively and cyclically move said planar element to said raised position for exposure of paper previously positioned on said easel, actuate said paper-feeding means to feed exposed paper from said easel and to feed fresh paper onto said easel, halt said paper-feeding means, move said planar element to said lowered position to overlie and guide the paper thereon, and re-actuate said paper-feeding means to position the paper on said easel for subsequent exposure.

2. In a photographic printer, means for intermittently advancing, exposing, and developing sensitized paper cyclically, comprising in combination: paper-feeding means, shearing means, and an easel, arranged in serial order for passage of sensitized paper therethrough; a planar element pivotally mounted with respect to said easel, for movement to a lowered position overlying said easel to overlie and guide paper thereover in a flat condition, and for movement to a raised position for exposing of paper positioned on said easel; programming mechanism comprising at least two cam means and intermittent drive gearing, drivingly connected for joint rotation, and motive means for rotationally driving said cam means and said drive gearing; means drivingly connecting said shearing means and said planar element each with one of said cam means; means drivingly connecting said paper-feeding means with said intermittent drive gearing; said cam means and said intermittent drive gearing being constructed and arranged to successively and cyclically move said planar element to said raised position for exposure of paper previously positioned on said easel, actuate said paper-feeding means to feed exposed paper from said easel and to feed fresh paper onto said easel, halt said paper-feeding means, actuate said shearing means to cut a sheet of predetermined size from the indefinite length of paper, move said planar element to said lowered position to overlie and guide the cut sheet, and re-actuate said paper-feeding means to position the cut sheet on said easel for subsequent exposure.

3. The combination recited in claim 2, wherein said intermittent drive gearing includes a driving gear connected to said motive means, and a driven gear connected to said paper-feeding means, said driving gear being formed with at least one toothed sector adapted to mesh with said driven gear during periods of drive, said driving gear being also formed with at least one toothless sector adapted to move past said driven gear during periods of dwell, and locking cams mounted on said gears for cooperation to lock said driven gear in fixed position during said periods of dwell.

4. The combination recited in claim 2, wherein said shearing means includes a fixed blade having a substantially straight cutting edge and a movable blade having a substantially straight cutting edge in contact with the cutting edge of said fixed blade, the planes of said blades as well as the cutting edges thereof being angularly offset from one another, said movable blade being adapted to move across said fixed blade so that the point of contact between said cutting edges moves lengthwise thereof while the angular relationship between said blades and their cutting edges remains substantially constant.

5. The combination recited in claim 2, in which said planar element comprises a reflector for directing an image onto paper positioned on said easel, when in said raised position.

6. In a photographic printer, means for intermittently advancing, exposing, and developing sensitized paper cyclically, comprising in combination: paper-feeding means, shearing means, an easel, and means forming a processing passage, arranged in serial order for passage of sensitized paper therethrough; a planar element pivotally mounted with respect to said easel for movement to a lowered position overlying said easel to overlie and guide paper positioned thereon in a flat condition into said processing passage, and for movement to a raised position for exposing paper positioned on said easel; programming mechanism comprising a rotatably-mounted shaft having at least two cam means and an intermittent drive gear affixed thereon, and motive means for rotationally driving said shaft; follower means drivingly connecting said shearing means and said planar element each with one of said cam means; a gear meshed with said drive gear and connected to drive said paper-feeding means; said cam means and said intermittent drive gear being constructed and arranged to successively and cyclically move said planar element to said raised position for exposure of paper previously positioned on said easel, actuate said paper-feeding means to feed exposed paper from said easel into said processing passage and to feed fresh paper onto said easel, halt said paper-feeding means, actuate said shearing means to cut a sheet of predetermined size from the indefinite length of paper, move said planar element to said lowered position to overlie and guide the cut sheet, and re-actuate said paper-feeding means to position the cut sheet on said easel for subsequent exposure.

References Cited in the file of this patent

UNITED STATES PATENTS

| | | |
|---|---|---|
| 442,823 | Palm | Dec. 16, 1890 |
| 1,822,677 | Taylor | Sept. 8, 1931 |
| 1,966,078 | Ohmer et al. | July 10, 1934 |
| 2,030,206 | Hanley et al. | Feb. 11, 1936 |
| 2,043,004 | Lloyd et al. | June 2, 1936 |
| 2,098,940 | Blohm | Nov. 16, 1937 |
| 2,493,998 | Pratt et al. | Jan. 10, 1950 |
| 2,564,440 | Maser et al. | Aug. 14, 1951 |
| 2,682,817 | Gross | July 6, 1954 |
| 2,735,335 | Shaw | Feb. 21, 1956 |
| 2,853,701 | Freedman et al. | Sept. 23, 1958 |
| 2,927,503 | Zollinger | Mar. 8, 1960 |
| 2,938,427 | Alves | May 31, 1960 |
| 3,002,434 | Reuter | Oct. 3, 1961 |
| 3,018,709 | Takats et al. | Jan. 30, 1962 |
| 3,055,266 | Frantz et al. | Sept. 25, 1962 |